United States Patent [19]

Wissler

[11] Patent Number: 4,826,232

[45] Date of Patent: May 2, 1989

[54] HOLLOW CHAMBER SEAL FOR A MOVABLE COVER OF A VEHICLE ROOF AND AN ADJUSTMENT PROCESS AND ROOF UNIT UTILIZING SAME

[75] Inventor: Thomas Wissler, Munich, Fed. Rep. of Germany

[73] Assignee: Webasto AG Fahrzeugtechnik, Gauting, Fed. Rep. of Germany

[21] Appl. No.: 131,410

[22] Filed: Dec. 10, 1987

[30] Foreign Application Priority Data

Dec. 12, 1986 [DE] Fed. Rep. of Germany ....... 3642470

[51] Int. Cl.⁴ .............................................. B60J 7/195
[52] U.S. Cl. .................................... 296/216; 296/222; 49/497; 49/498; 156/303.1; 156/293
[58] Field of Search ............... 296/216, 218, 221, 222; 49/497, 482, 498, 488, 69-88; 156/303.1, 293; 29/404

[56] References Cited

U.S. PATENT DOCUMENTS

| | | | |
|---|---|---|---|
| 2,963,754 | 12/1960 | Herman | 49/497 |
| 2,988,788 | 6/1961 | Saponara | 49/497 X |
| 4,312,534 | 1/1982 | Jardin et al. | |
| 4,676,493 | 6/1987 | Helbig | 296/216 |

FOREIGN PATENT DOCUMENTS

| | | | |
|---|---|---|---|
| 3442653 | 6/1986 | Fed. Rep. of Germany . | |
| 3604298 | 6/1987 | Fed. Rep. of Germany . | |
| 2033850 | 5/1980 | United Kingdom | 296/222 |
| 2186312 | 8/1987 | United Kingdom . | |

Primary Examiner—James B. Marbert
Assistant Examiner—Brian Sells
Attorney, Agent, or Firm—Sixbey, Friedman, Leedom & Ferguson

[57] ABSTRACT

Hollow chamber seal for sealing an edge gap between an edge of a fixed roof section and a movable cover of a vehicle roof in which both a deformation of the hollow chamber and an additional deformation of the seal are possible to compensate for the gap tolerances. In accordance with preferred embodiments, to produce the additional deformation, at least one hollow chamber part is connected to a sealing body for pivotal movement around a bending axis that extends substantially parallel to the major surfaces of the cover in a direction parallel to the edge of the cover. Using such a seal, in accordance with process aspects of the invention, surface tolerances of a movable cover of an automobile roof can be compensated for by inserting the cover with the attached hollow chamber seal into a template, bringing the hollow chamber part into a pivoted position that corresponds to predetermined external measurements of a roof unit including the cover and the hollow chamber seal, and by attaching the hollow chamber part to the sealing body in this pivoted position. In accordance with this process, a roof unit is produced which will appropriately fit in sealed relation to an edge of a fixed roof section defining a roof opening to be closed by the cover despite tolerance variations in, e.g., the dimensions of the cover.

26 Claims, 3 Drawing Sheets

HOLLOW CHAMBER SEAL FOR A MOVABLE COVER OF A VEHICLE ROOF AND AN ADJUSTMENT PROCESS AND ROOF UNIT UTILIZING SAME

BACKGROUND AND SUMMARY OF THE INVENTION

The invention relates to a hollow chamber seal for sealing a gap between an edge of a fixed roof section and a movable cover of a vehicle roof in which both a deformation of the hollow chamber and an additional deformation of the seal are possible to compensate for gap tolerances.

In a known hollow chamber seal of this type German Pat. No. 34 42 653 that is intended for attachment on the edge of the roof section, a hollow chamber is provided in a widened part of the seal that borders the roof section and the widened part goes into a tapered sealing part extending away from the roof section. This tapered sealing part is held securely in a space between the fixed roof area and a strip fastened under it. The hollow chamber seal exhibits, a bulge allocated to the front side of the strip, a bulge that is braced on the front side only locally on the elevations formed from the front side. If, in the known seal, the deformation capacity of the hollow chamber is virtually exhausted, sealing material can be pushed into the interspaces formed between the elevations. In this way, two consecutive possibilities for compensation are obtained. In the known hollow chamber seal, when there is a narrow gap, the displacement of sealing material into the interspaces between the elevations on the front side of the strip causes a sharp increase in the contact pressure. The displacement of the sealing material after exhaustion of the deformation capacity of the hollow chamber further leads to only a relatively limited additional possibility for tolerance compensation.

The primary object of the present invention, therefore, is to provide a hollow chamber seal of the initially mentioned type that allows an even greater tolerance compensation and provides for a relatively small increase in the contact pressure when the gap is narrow. Simultaneously, the present invention seeks to ensure simple installation without the need for additional parts.

This object is achieved according to preferred embodiments of the invention in that, for the additional deformation, a part of the seal having at least one hollow chamber is connected to the sealing body so that it can pivot around a swivel axis that is parallel or nearly parallel to the major surfaces of the cover, i.e. the axis extends lengthwise along the seal parallel to the edge of the cover to which the seal is mounted.

The swivel connection between the hollow chamber part and the sealing body can be simply designed so that even pivoting movements of the hollow chamber part around relatively large pivoting angles require only a small exertion of force. The hollow chamber seal according to the invention, thus, allows larger tolerances to be compensated for without problems and, particularly, without an excessive increase in the contact pressure when the gap is small. Additional parts, such as the strips necessary in the known seal, are not required. Correspondingly, the hollow chamber seal can be installed in an especially simple manner.

In further aspects of preferred embodiments, the sealing body can be made for direct fastening on the edge of a cover, of transparent or translucent material, i.e., for this purpose it can be provided with two arms that project from the sides, are essentially parallel and, in the installed state, surround the edge area of the cover from above and below. An especially simple seal design is obtained if the hollow chamber part is hinged on the sealing body by a elastically deformable arm that forms the bending axis.

The sealing body can exhibit, on a side facing away from the swivel axis, a lip that extends horizontally at least partially over the hollow chamber part or, on the other hand, the hollow chamber part can have, on a side facing away from the swivel axis, a lip that extends horizontally at least partially over the sealing body.

In the installed condition of the seal, the hollow chamber part can also be made to pivot opposite the sealing body. However, according to a preferred embodiment of the invention, it is also possible to provide means to fasten the hollow chamber part to the sealing body in a pivoting position determined during an adjustment process. For fastening in this way, the lip and the hollow chamber part or the sealing body can be provided, on the surfaces facing each other, with notch means, for example toothing or a flocking.

To limit the pivot angle of the hollow chamber part opposite the sealing body, at least one stop can be provided. The lip can, together with the hollow chamber part and the sealing body, delimit a space that is open toward the bottom of the seal to provide an increase in the contact pressure of the seal, at higher vehicle speeds by using the excess pressure then occurring in the vehicle interior. If the cover would be able to fit from above and below into the roof section as is the case, for example, with roofs that both slidably retract and upwardly tilt, the hollow chamber seal, preferably, has two superposed hollow chamber parts that are appropriately connected in areas that face each other and can each be pivoted around one of two superposed swivel axes.

Using a hollow chamber seal according to the invention, surface tolerances of a movable cover of a vehicle roof can easily be compensated in that the cover with the attached hollow chamber seal is inserted into a template, bringing the hollow chamber part into a pivoting position that corresponds to predetermined external dimensions of the unit consisting of the cover and the hollow chamber seal, and in that the hollow chamber part is placed opposite the sealing body in this pivoting position, for example by using the above mentioned notch means or by putting adhesive between the hollow chamber part and the sealing body.

DETAILED DESCRIPTION OF THE PREFERRED EMBODIMENTS

Figure 1:
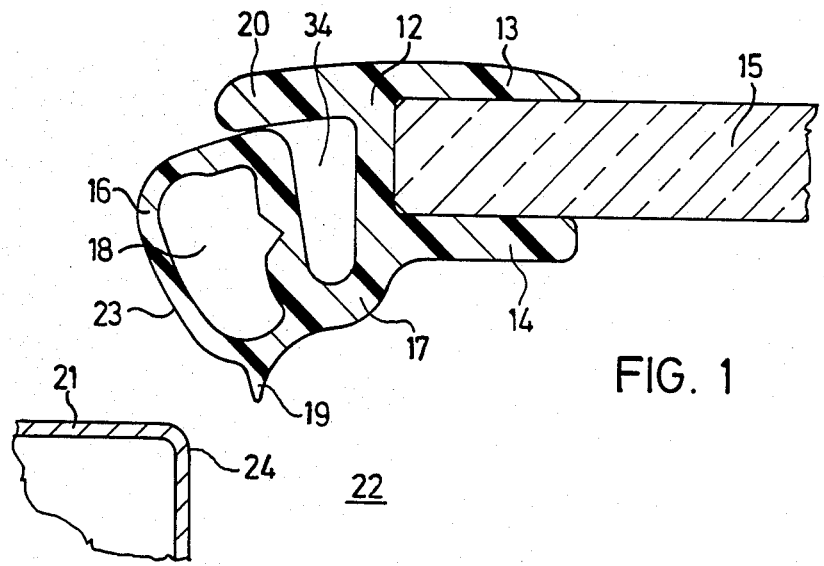
FIG. 1 shows a hollow chamber seal attached to a glass cover, when the vehicle roof is open.
Figure 2:
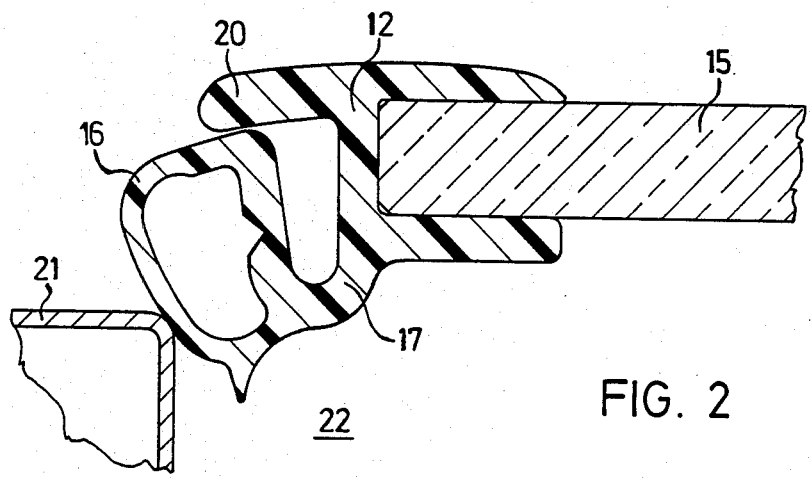
FIG. 2 shows the seal according to FIG. 1 during the closing process.
Figure 3:
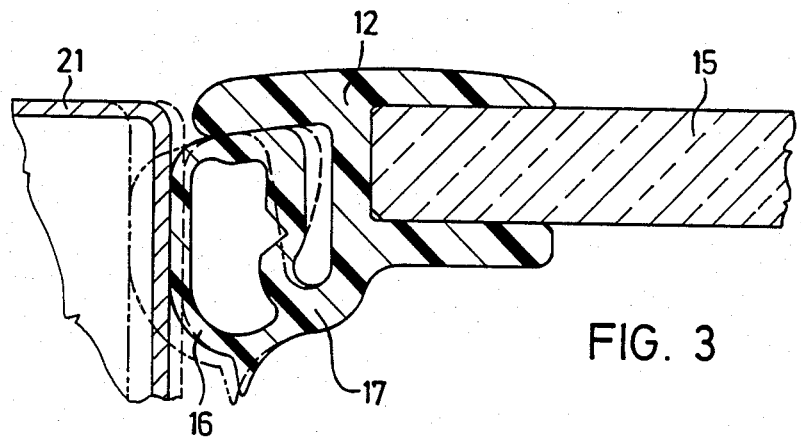
FIG. 3 shows the seal according to FIG. 1 when the vehicle roof is closed.

The hollow chamber seal shown in FIGS. 1 to 3 is especially suited for upwardly tilting lifting roofs, and has a sealing body 12 that, with arms 13 and 14 which project laterally from body 12, surrounds an edge area of a movable cover 15 made of a transparent or translucent material such as glass (as shown for the portion illustrated). A hollow chamber part 16 is connected by an elastically deformable arm 17 to sealing body 12. An arm 17 forms a bending axis that extends parallel to the main surfaces (top and bottom side) of cover 15 in the direction of the edge to which sealing body 12 is mounted, i.e., extends in the lengthwise direction of the seal. The hollow chamber part 16 can be pivoted around this swivel axis with reference to sealing body 12. Hollow chamber part 16 includes a hollow chamber 18 and is provided with a drip nose 19 at its underside. On the side of sealing body 12 that faces away from arm 13, an integrally molded-on lip 20 is provided that extends horizontally partially above hollow chamber part 16.

A fixed section of an automobile roof is diagrammatically shown at 21. Automobile roof 21 is formed with a roof opening 22 that can be selectively closed or at least partially opened by cover 15. In the transition of cover 15 from its position according to FIG. 1 into the position shown in FIG. 2, a stop face 23 of hollow chamber part 16, that forms an acute angle with the main surfaces of cover 15, is brought into contact against an edge 24 of the roof section 21 bounding roof opening 22. Thus, hollow chamber part 16 pivots around the bending axis determined by arm 17 toward the sealing body 12. Further, a deformation of the hollow chamber part 16 can result.

In FIG. 3, three different positions of edge 24 of the roof section 21 relative to cover 15 are diagrammatically shown (one in solid line, one in dot-dash line, and one in dash line). Such varying relative positions can result, especially from the surfaces tolerances of glass cover 15, but also from tolerances of the dimensions of the roof section itself. It can be clearly seen that the dual compensation possibilities (i.e., pivoting of the hollow chamber part and deformation of the hollow chamber) allow greater tolerances to be compensated for. Since, in this case, pivoting of the hollow chamber part requires only relatively little force, small gaps cause only a relatively small increase in the contact pressure.

This structural design of the hollow chamber seal also allows the surface dimension of the unit consisting of the cover, especially glass cover 15, and the attached hollow chamber seal to be adjusted and set at a desired theoretical value. For this, especially the cover with the attached hollow chamber seal can be inserted, according to FIG. 4, into a template 25 that predetermines the theoretical value for the surface dimension of the unit consisting of the cover and the hollow chamber seal. During this insertion, hollow chamber part 16, essentially without deformation of hollow chamber 18, is brought into a pivoted position that is dependent on the respective surface dimension of cover 15. In this pivoting position, the hollow chamber part is fixed to sealing body 12, such as by an adhesive 26, as shown according to FIG. 4.

Figure 4:
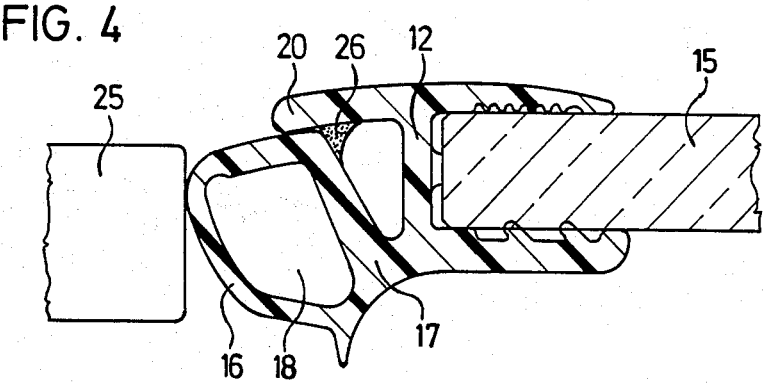
FIGS. 4 to 8 show sections through hollow chamber seals according to modified embodiments of the invention, an adjustment template also being shown in FIG. 4.
Figure 5:
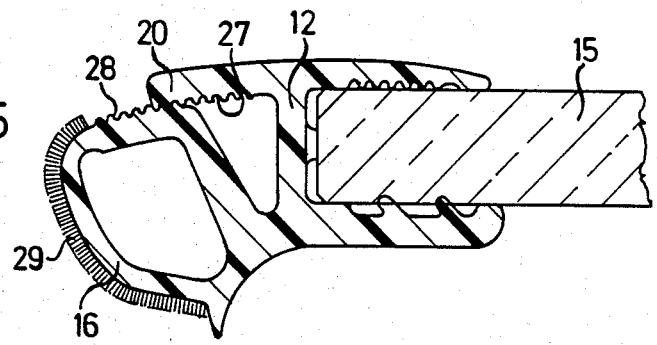

In the drawings, the parts of modified seal embodiments bear the same reference numerals as the corresponding parts shown in the embodiment of FIGS. 1-3, except increased by a prefix number corresponding to the Figure Number in which they appear (i.e., lips 420 and 520 of FIGS. 4, 5 correspond to lip 20 of FIGS. 1-3). In FIG. 4, the seal differs from that of FIGS. 1-3 only in the provision of gripping ribs on the mounting arms and the elimination of a flexing notch provided on the wall of the hollow seal part opposite seal body 412.

In the case of the modified embodiment according to FIG. 5, there is provided, on facing sides of lip 520 and hollow chamber part 516, a toothing or notching 27 and 28 that are set relative to each other during an initial adjustment process of the above-mentioned kind using template 25, and then, hold hollow chamber part 516 in the set position relative to sealing body 512. In FIG. 5, a flocking 29 is further indicated in the area of stop face 523.

Figure 6:
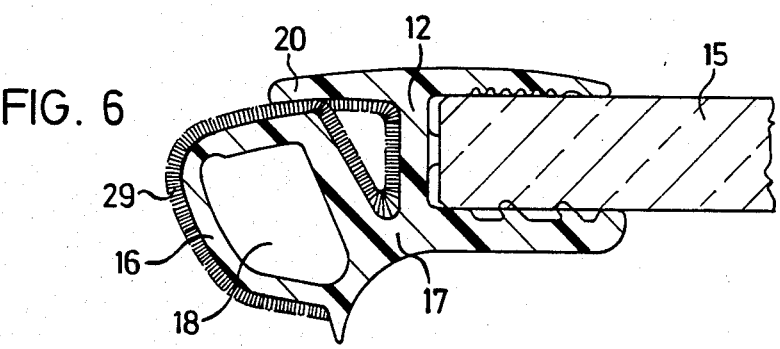

The locking of hollow chamber part in a predetermined pivoted position (set during an adjustment process) relative to the sealing body can, in principle, occur other ways. For example, the flocking 629 may extend to the surfaces of hollow chamber part 616 and lip 620 that are in contact with each other, as represented in FIG. 6.

Figure 7:
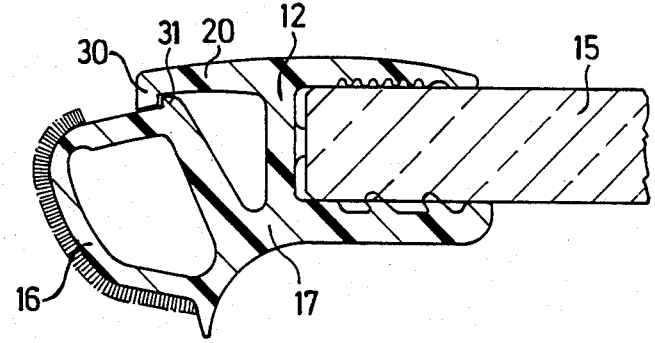

In the embodiment according to FIG. 7, lip 720 has a downward projection, giving it a hook shape at its free end 30. Hollow chamber part 716 has a protruding stop 31 on its upper inner edge that acts together with end projection 30 to limit the outward pivot angle of hollow chamber 16 relative to sealing body 712.

Figure 8:
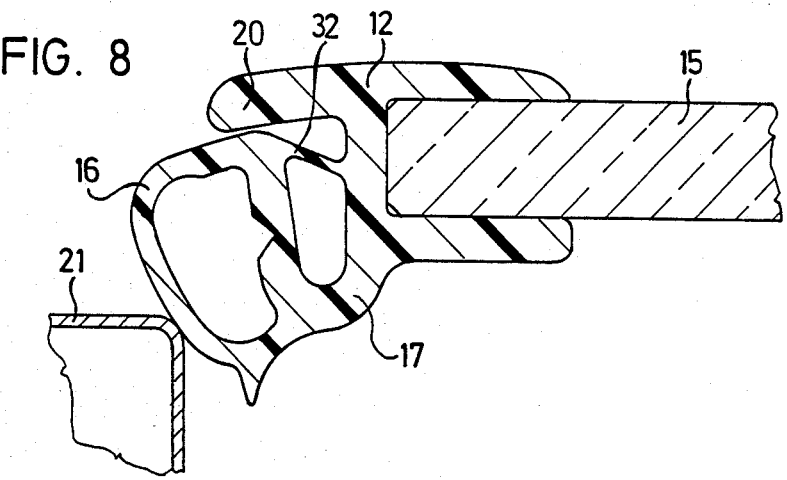

FIG. 8 shows a further modified embodiment of the hollow chamber seal in which a thin, especially easily deformable arm 32 is provided to limit the outward pivot angle of hollow chamber part 816 relative to sealing body 812. Arm 32 establishes a connection between the upper end of the hollow chamber part (i.e., the end) that faces away from the bending axis between the hollow chamber part and sealing body 812. When hollow chamber part 816 is pivoted in the direction of sealing body 812, arm 32 folds up without exerting a significant counterforce.

Figure 9:
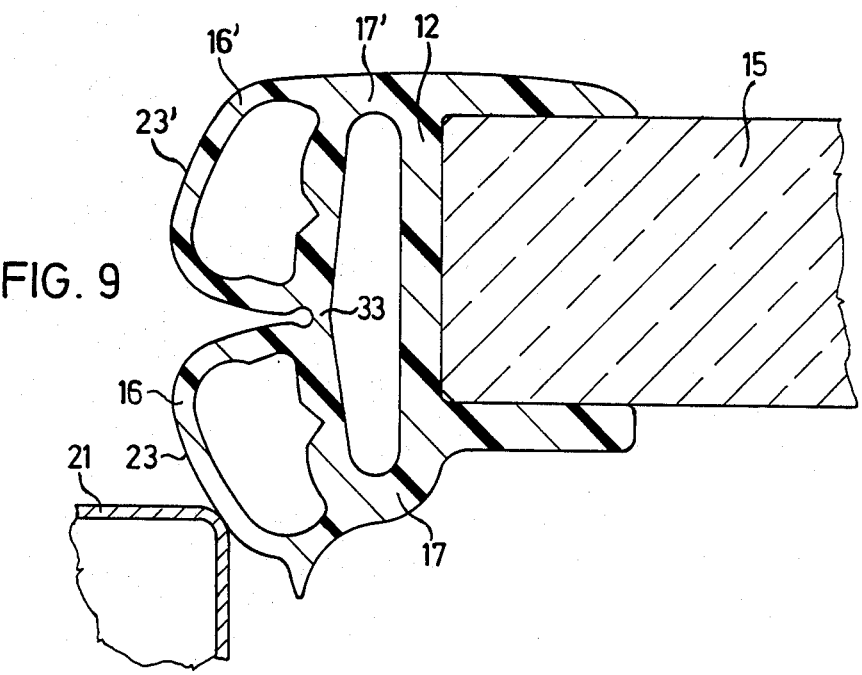
FIG. 9 shows an embodiment of a hollow chamber seal that is particularly suitable for covers that move into a closed position from both above and below the fixed roof section.

While the embodiments of the hollow chamber seal explained above are suitable for covers that move into the position closing the opening in the roof section from above, i.e., especially for lifting roofs, FIG. 9 shows an embodiment for automobile roofs in which the cover can go into the closed position from below and above, as is the case especially with roofs that both slidably retract and tiltably lift. The hollow chamber seal according to FIG. 9 has two superposed hollow chamber parts 916, 916'. Hollow chamber parts 916, 916' are connected to sealing body 912 by arms 917, 917' that each determine a bending axis for the pivoting of matching hollow chamber parts 916 or 916' opposite sealing body 912. Hollow chamber parts 916, 916' are further connected to each other in the areas facing each other, as shown at 33. While stop face 923 of lower hollow chamber part 916 forms an acute angle with the major surfaces of cover 915, as in the case of the embodiments previously described, contact surface 923' of upper hollow chamber part 16' runs at an angle that is the mirror image of the angle of stop face 923, relative to a plane that is parallel to the major surfaces of the cover.

Figure 10:
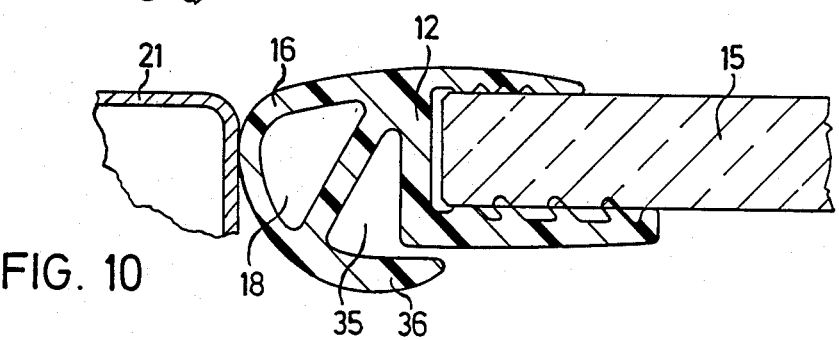
FIG. 10 shows a section through a further embodiment of a hollow chamber seal in accordance with the invention.

While in the embodiments of FIGS. 1 to 7 the hollow chamber part and sealing body delimit a space 34 that opens upward, hollow chamber part 1016 and sealing body 1012, in the embodiment according to FIG. 10, form a space 35 that opens downward. This means that the swivel axis for the pivoting motion of hollow chamber part 1016 is near the upper side of the hollow chamber seal. A lip 36 is, in this case, on the lower side of hollow chamber part 1016 and extends a little beneath the lower side of sealing body 1012. Since at high speeds overpressure forms in an automobile, the pressure acting in space 35 reinforces the contact pressure of the seal at such speeds. Such a seal construction is of particular use for roofs where the cover moves into its closed position from below, as is the case for roofs of the slidably retractable type.

It should be appreciated that aspects of the various hollow chamber seal embodiments can be combined with each other in manners beyond those shown. Likewise, all of the embodiments are usable to perform the described adjustment process with template 25 to form a preadjusted roof unit.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Hollow chamber seal of the type for sealing an edge gap between an edge of a fixed roof section and an edge of a movable cover of a vehicle roof comprised of a sealing body, a hollow chamber part and a flexible connection between the hollow chamber part and the sealing body, in which the hollow chamber seal is deformable by both a deformation of the hollow chamber part and an additional deformation of the hollow chamber seal for compensating for gap size tolerances, wherein the hollow chamber part has at least one hollow chamber and the flexible connection between the hollow chamber part and the sealing body enables the hollow chamber part to be pivotable around a bending axis formed thereby that extends substantially parallel to a lengthwise direction of the seal to produce said additional deformation, and wherein securing means for fastening of the hollow chamber part to the sealing body in a preset swivel position is provided.

2. Hollow chamber seal according to claim 1, wherein the hollow chamber part is hinged to the sealing body by an elastically deformable arm that forms the swivel axis.

3. Hollow chamber seal according to claim 2, wherein the sealing body has a lip on a side facing away from the swivel axis, said lip extending horizontally at least partially above said hollow chamber part.

4. Hollow chamber seal according to claim 1, wherein the sealing body has a lip on a side facing away from the swivel axis, said lip extending horizontally at least partially above said hollow chamber part.

5. Hollow chamber seal according to claim 2, wherein hollow chamber part has a lip on a side facing away from the swivel axis, said lip extending horizontally at least partially along said sealing body.

6. Hollow chamber seal of the type for sealing an edge gap between an edge of a fixed roof section and an edge of a movable cover of a vehicle roof comprised of a sealing body, a hollow chamber part and a flexible connection between the hollow chamber part and the sealing body, in which the hollow chamber seal is deformable by both a deformation of the hollow chamber part and an additional deformation of the hollow chamber seal for compensating for gap size tolerances, wherein the hollow chamber part has at least one hollow chamber and the flexible connection between the hollow chamber part and the sealing body enables the hollow chamber part to be pivotable around a bending axis formed thereby that extends substantially parallel to a lengthwise direction of the seal to produce said additional deformation, wherein said hollow chamber part has a lip on a side facing away from the bending axis, said lip extending horizontally at least partially along said sealing body.

7. Hollow chamber seal according to claim 1, wherein securing means comprises locking means provided facing surfaces of said hollow chamber part and said sealing body.

8. Hollow chamber seal according to claim 7, wherein toothing are provided as said locking means.

9. Hollow chamber seal according to claim 7, wherein a flocking is provided as said locking means.

10. Hollow chamber seal according to claim 7, wherein said locking means comprises at least one stop to limit the pivoting angle of hollow chamber part relative to the sealing body.

11. Hollow chamber seal according to claim 10, wherein said at least one stop comprises a downward projection on said lip and a protruding stop on a facing surface of the hollow chamber part.

12. Hollow chamber seal according to claim 6, wherein said lip, together with the hollow chamber part and sealing body define a space that is open toward a lower side of the seal.

13. Hollow chamber seal of the type for sealing an edge gap between an edge of a fixed roof section and an edge of a movable cover of a vehicle roof comprised of a sealing body, a hollow chamber part and a flexible connection between the hollow chamber part and the sealing body, in which the hollow chamber seal is deformable by both a deformation of the hollow chamber part and an additional deformation of the hollow chamber seal for compensating for gap size tolerances, wherein the hollow chamber part has at least one hollow chamber and the flexible connection between the hollow chamber part and the sealing body enables the hollow chamber part to be pivotable around a bending axis formed thereby that extends substantially parallel to a lengthwise direction of the seal to produce said additional deformation, wherein there are two superposed hollow chamber parts, each of which is pivotable around one of two superposed bending axes.

14. Hollow chamber seal according to claim 13, wherein both hollow chamber parts are connected to each other at sides facing each other.

15. Hollow chamber seal according to claim 1, wherein said sealing body is provided with a pair of mounting arms by which said hollow chamber seal is seatable upon said edge of the movable cover.

16. Hollow chamber seal according to claim 15, wherein the hollow chamber part is hinged to the sealing body by an elastically deformable arm that forms the bending axis.

17. Process for compensating for surface tolerances between an edge of a fixed roof section and a movable cover of a vehicle roof using a hollow chamber seal, comprising the steps of: mounting a hollow chamber seal, having a sealing body, at least one deformable hollow chamber part and a flexible connection between the hollow chamber part and the sealing body forming a bending axis that extends substantially parallel to a lengthwise axis of the hollow chamber seal, onto an edge of the movable cover; inserting the cover with the attached hollow chamber seal into a template in a manner bringing the hollow chamber part into a pivoted position relative to the sealing body that corresponds to predetermined external measurements of a roof unit including the movable cover and the hollow chamber seal; and fastening the hollow part to the sealing body in this pivoted position.

18. Process according to claim 17, wherein said fastening step comprises the application of adhesive between the hollow chamber part and the sealing body.

19. Hollow chamber seal according to claim 1, wherein the sealing body is directly attachable to an edge of the movable cover which is made of a transparent or translucent material.

20. A roof unit for a motor vehicle comprising a movable cover and a hollow chamber seal mounted to an edge of the movable cover for sealing an edge gap between an edge of a fixed roof section of a motor vehicle and the edge of said movable cover, wherein said hollow chamber seal is comprised of a sealing body carried by said movable cover, a hollow chamber part for engaging said edge of the fixed roof section, and a flexible connection disposed between the hollow chamber part and the sealing body; wherein said hollow chamber seal is deformable by both a deformation of a hollow chamber part thereof and by an additional deformation of the seal for compensating for gap size tolerances, and wherein the hollow chamber part has at least one hollow chamber and the flexible connection between the hollow chamber part and the sealing body enables the hollow chamber part to pivot relative to the sealing body around a bending axis that extends substantially parallel to a lengthwise direction of the seal to produce said additional deformation, wherein securing means for fastening of the hollow chamber part to the sealing body in a preset pivot position is provided.

21. A roof unit according to claim 20, wherein the hollow chamber part is hinged to the sealing body by an elastically deformable arm that forms the bending axis.

22. A roof unit according to claim 21, wherein the sealing body has a lip on a side facing away from the bending axis, said lip extending horizontally at least partially above said hollow chamber part.

23. A roof unit for a motor vehicle comprising a movable cover and a hollow chamber seal mounted to an edge of the movable cover for sealing an edge gap between an edge of a fixed roof section of a motor vehicle and the edge of said movable cover, wherein said hollow chamber seal is comprised of a sealing body carried by said movable cover, a hollow chamber part for engaging said edge of the fixed roof section, and a flexible connection disposed between the hollow chamber part and the sealing body; wherein said hollow chamber seal is deformable by both a deformation of a hollow chamber part thereof and by an additional deformation of the seal for compensating for gap size tolerances, and wherein the hollow chamber part has at least one hollow chamber and the flexible connection between the hollow chamber part and the sealing body enables the hollow chamber part to pivot relative to the sealing body around a bending axis that extends substantially parallel to a lengthwise direction of the seal to produce said additional deformation, wherein the hollow chamber part has a lip on a side facing away from the bending axis, said lip extending horizontally at least partially along said sealing body.

24. A roof unit for a motor vehicle comprising a movable cover and a hollow chamber seal mounted to an edge of the movable cover for sealing an edge gap between an edge of a fixed roof section of a motor vehicle and the edge of said movable cover, wherein said hollow chamber seal is comprised of a sealing body carried by said movable cover, a hollow chamber part for engaging said edge of the fixed roof section, and a flexible connection disposed between the hollow chamber part and the sealing body; wherein said hollow chamber seal is deformable by both a deformation of a hollow chamber part thereof and by an additional deformation of the seal for compensating for gap size tolerances, and wherein the hollow chamber part has at least one hollow chamber and the flexible connection between the hollow chamber part and the sealing body enables the hollow chamber part to pivot relative to the sealing body around a bending axis that extends substantially parallel to a lengthwise direction of the seal to produce said additional deformation, wherein there are two superposed hollow chamber parts, each of which is pivotable around one of two superposed bending axes.

25. A roof unit according to claim 20, wherein said sealing body is provided with a pair of mounting arms by which said hollow chamber seal is seatable upon said edge of the movable cover.

26. A roof unit according to claim 25, wherein the hollow chamber part is hinged to the sealing body by an elastically deformable arm that forms the bending axis.

* * * * *